Sept. 16, 1924.  1,508,807

G. W. SMITH ET AL

METHOD OF MANUFACTURING CARBURETED WATER GAS

Filed June 9, 1920  3 Sheets-Sheet 1

George W Smith
Frank L. Weisser
Inventors

By George Ramsey
Attorney

Sept. 16, 1924.

G. W. SMITH ET AL 1,508,807

METHOD OF MANUFACTURING CARBURETED WATER GAS

Filed June 9, 1920  3 Sheets-Sheet 2

Inventors
George W. Smith
Frank L. Weisser
By Attorney
George Ramsey

Sept. 16, 1924.                                         1,508,807
                       G. W. SMITH ET AL
          METHOD OF MANUFACTURING CARBURETED WATER GAS
                    Filed June 9, 1920         3 Sheets-Sheet 3

Patented Sept. 16, 1924.

1,508,807

UNITED STATES PATENT OFFICE.

GEORGE WALLACE SMITH AND FRANK L. WEISSER, OF SAN ANTONIO, TEXAS.

METHOD OF MANUFACTURING CARBURETED WATER GAS.

Application filed June 9, 1920. Serial No. 387,717.

*To all whom it may concern:*

Be it known that we, GEORGE WALLACE SMITH and FRANK L. WEISSER, citizens of the United States, and residents of the city of San Antonio, county of Bexar, and State of Texas, have invented certain new and useful Improvements in Methods of Manufacturing Carbureted Water Gas, of which the following is a specification.

This invention relates broadly to the manufacture of carbureted water gas, and more particularly to the method of manufacturing such gas and economically removing objectionable carbon deposits that accumulate in the machines used in the manufacture thereof during such manufacture, by a process of oxidation without shutting down said machines during such removal or interfering with the operation thereof while said carbon deposits are being removed, thereby increasing the efficiency of such machines and decreasing the cost of up-keep through keeping them more nearly at maximum efficiency by reason of the more frequent removal of such carbon without shutting down the machine or removing the checker brick and permitting the use of lower grades of oil in the manufacture of such gas, and decreasing the cost of making such gas.

Under the present method of manufacturing carbureted water gas a plurality of shells, usually four in number, are used. These consist of a generator, carburetor, superheater, and seal, so constructed and connected that the gases pass from the generator through the carburetor from the top to the bottom thereof and through it to the bottom of the superheater and from thence to the top of such superheater and out into the seal. This course of the gases under the present methods and with the present machinery used for the manufacture of carbureted water gas is absolutely fixed as here specified. In the process of manufacturing carbureted water gas, oil is sprayed on the checker brick in the carburetor for the purpose of enriching the blue or water gas coming from the generator. A part of this oil is gasified and carried along with the gas from the generator down through the carburetor and up through the superheater where the fixing process is completed. However, where any but a high grade oil is used, a part of the oil remains as a deposit, principally carbon, on the checker brick in the carburetor. As each run of gas is made, more carbon deposits on the checker brick, and this continues until the openings in the checker brick are so nearly stopped up with carbon as to prevent further economical or practical operation thereof without cleaning off these deposits and it therefore frequently becomes necessary to put the entire apparatus out of service until the carburetor is cleaned out by removing the checker brick and the carbon deposit attached, and installing new checker brick. The period of time in which the carburetor becomes so choked up by such carbon deposits varies, depending largely on the quality of oil used—the low grade oils choking it up much quicker than the high grade oils, as such oils carry a heavier carbon deposit. While these carbon deposits are accumulating the efficiency of the machine is being thereby approximately proportionately diminished and the cost of producing each thousand feet of gas increased approximately in the same proportion.

At the present time there is no method of limiting this formation of carbon deposit on the checker brick in this type of apparatus; and no method of removing it after it is formed, except by the shutting down of the entire apparatus and removing the checker brick, together with the deposit attached to them and replacing them with new brick or some other equally inefficient method.

The principal object of this invention is to provide a method by which such carbon deposits are removed by oxidation without shutting down the apparatus or any part of it, and without interfering with its efficient operation during such removal, and without removing the checker brick, thereby increasing the efficiency of such apparatus and materially decreasing the cost of up-keep by keeping them more nearly at maximum efficiency because of the more frequent removal of the carbon and by the carbon removal being effected without interfering with the operation of the apparatus and without taking out the checker brick, and permitting the use of lower or cheaper grades of oil in the manufacture of such gas, and decreasing the cost of its manufacture.

Referring now more particularly to the drawing, Figure 1 shows a plan view of one suggested arrangement of the shells of a carbureted water gas set with our layout of connections and valves as covered by this invention.

Figure 1:
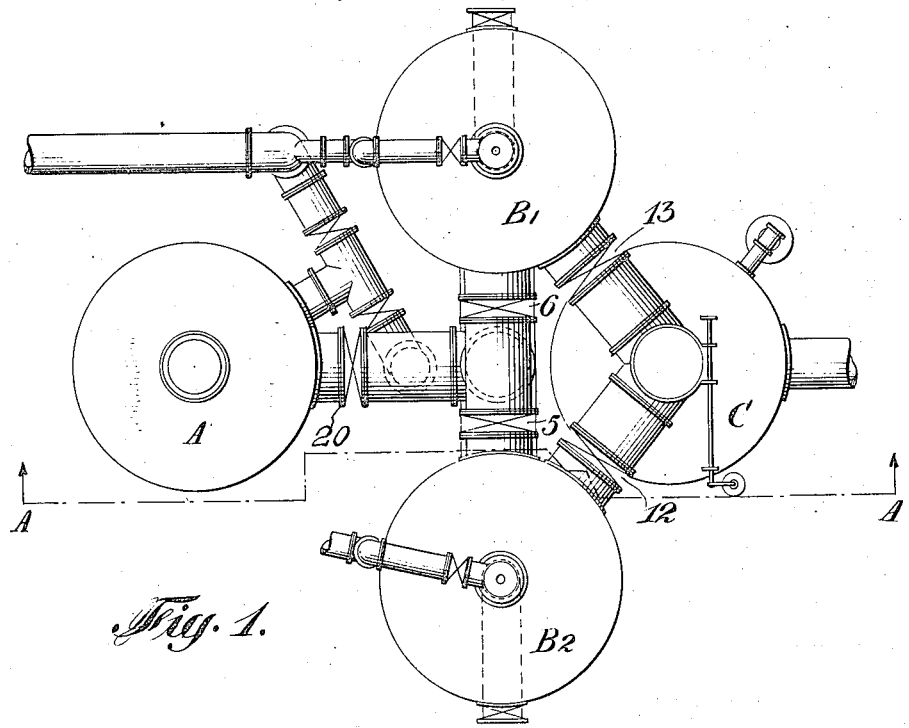
Figure 2:
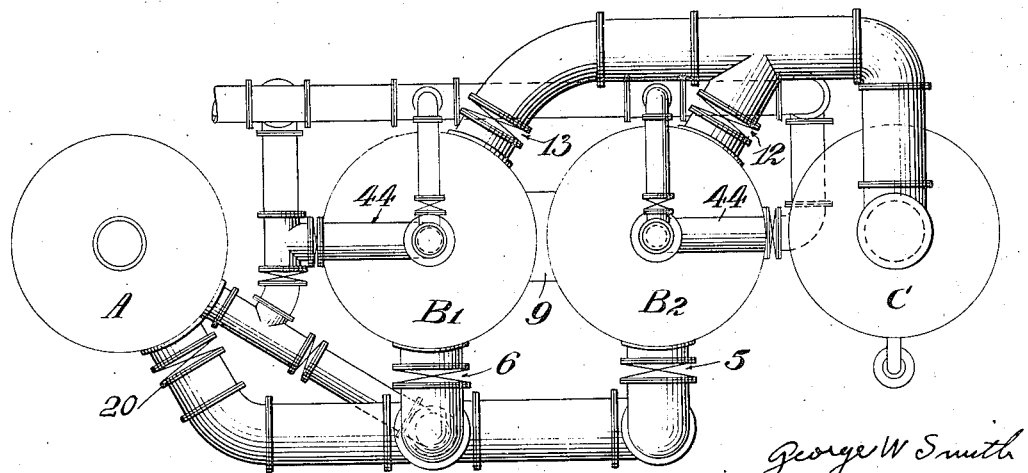
Figure 2 shows a plan view of the connections and valves, covered by this invention, as applied to carbureted water gas sets as they are now installed, and where it is not practical or desirable because of lack of room or for any other reason to arrange them as shown in Figure 1.
Figure 3:
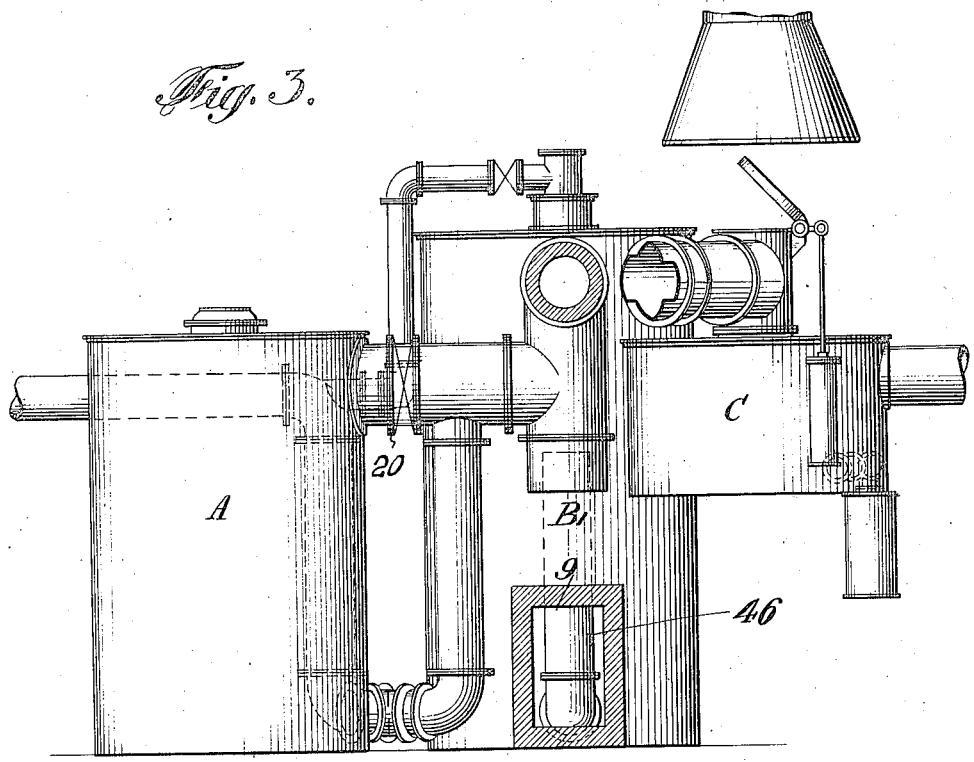
Figure 3 is an elevation of layout shown in plan in Figure 1 taken from the line A—A, and in the direction of the arrows at A and A.

Referring more particularly to the drawings, there is illustrated broadly the arrangement of connecting pipes and ducts with the necessary valves for building new carbureted water gas sets, and for adapting the present form of carbureted water gas apparatus to accomplish the purposes set forth above.

In the above specified drawing A is the generator; B and B² are the fixing shells; C is the seal. Valves 5, 6, 12, and 13 are hot valves in addition to the hot valve 20 now installed on the outlet from the generator A.

It will be seen from the specifications and drawings herewith that instead of the flow of the gas from the generator being always forced from the top to the bottom of one shell known as the carburetor, and from thence into the bottom of the other shell known as the superheater and from thence up to the top of the superheater and out into the seal, the shells B, and B² are so constructed and so connected with the generator as to be used interchangeably as carburetor or superheater, as may be desired. That is to say, the flow of the gas from the generator is by means of the connections set out in the drawing, conducted into the top of either shell as selected and the oil sprayed into the top of the shell, thus selected, and from thence the gas is forced down through that shell to the bottom thereof, thence through duct 9 into the bottom of the other shell and out through the top thereof.

Figure 4:
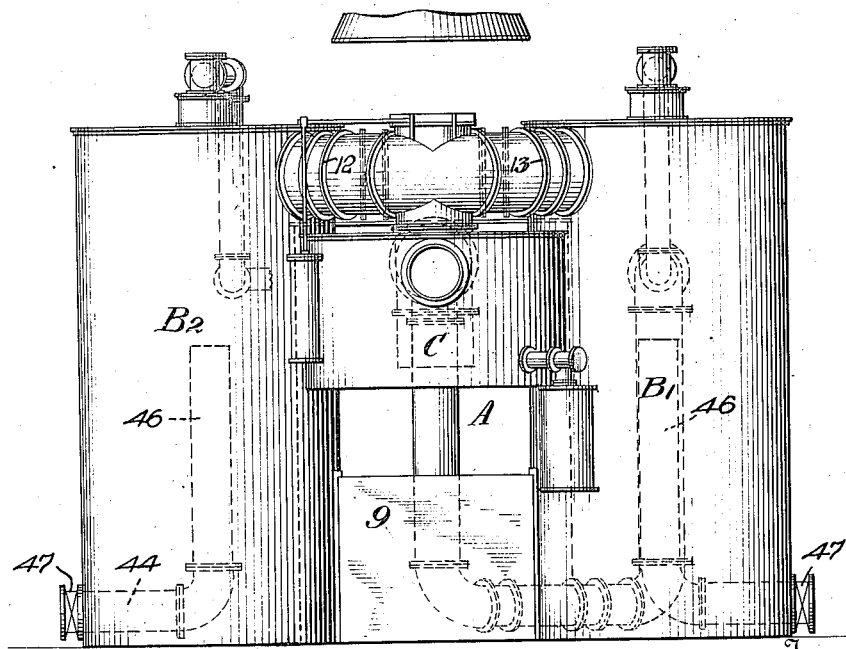
Figure 4 is an elevation of the plan view shown in Figure 1, taken from the rear end of the set, that is from the end on which the seal is located.

When it is desired to use shell B, as a carburetor and to spray oil into the top thereof, the gas passes from the generator through the connection duct containing valve 6, which in this case would be open and likewise valve 12 would be open while valve 5 in the connection duct to shell B² and valve 13 would both be closed. Valves 12 and 13 are in the pipes leading from the tops of the respective shells B² and B¹ as shown in Figure 4.

When it is desired to use B² as a carburetor, valve 6 is closed and gas passes from the generator through the connection duct containing valve 5 which in this case would be open, valve 13 would also be open while valve 12 would be closed.

Each of the shells B and B² are so arranged as to provide for spraying oil into the top of said shell, and also for the introduction of an air blast into each shell, but the oil spray and air blast are used only when that shell is being used as a carburetor.

The reason for having the shells B¹ and B² so arranged that they may be alternated as a carburetor and a superheater, is because the carbon deposit takes place in a shell only while it is being used as a carburetor, and when one shell B has been used as a carburetor for a time and therefore a carbon deposit has accumulated, the gas flow is changed by the means above stated to the other shell B², and the shell B in which the carbon deposit has taken place is then changed from being used as a carburetor and used as a superheater, while the shell B² which was used as a superheater, is now used as a carburetor and therefore the gas is forced from the generator into the top of B² and down through B² at the bottom thereof into B and out through the top thereof into the seal, and during the use of B as a superheater the carbon deposit which accumulated while this shell was used as a carburetor is now burned out by the separate admission of air thereto during each of the series of blow periods.

Figure 5:
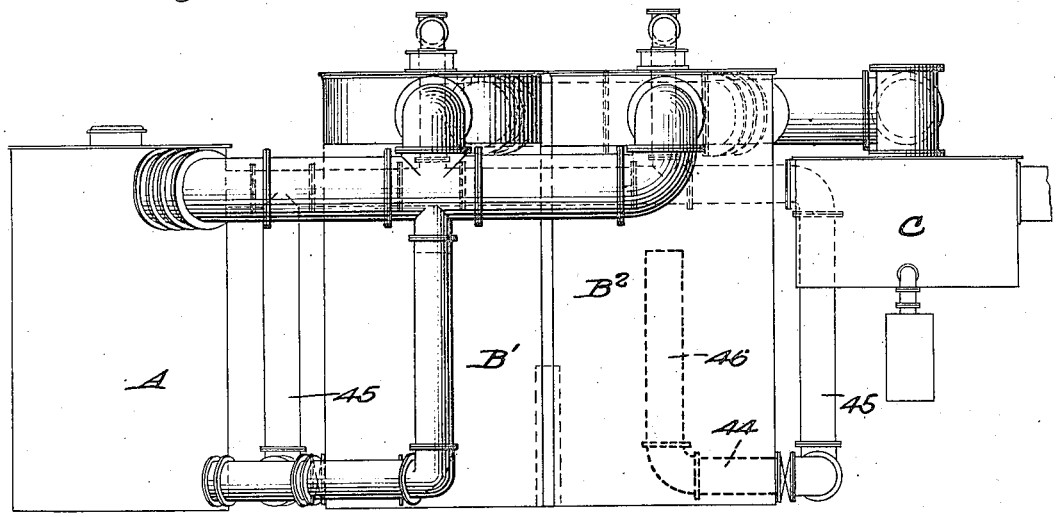
Figure 5 is a side elevation of the plan shown in Figure 2.
Figure 6:
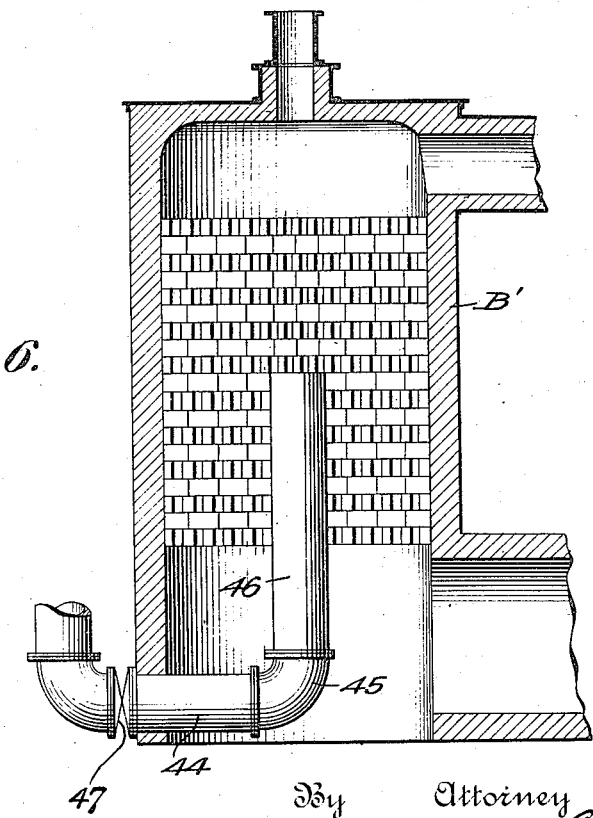
Figure 6 is a vertical section through the center line, and a detail of one of the fixing shells, and shows, in general, the method of installing an air duct for injecting air into the shell used as a superheater for forming the oxidizing zone.

This is the more effectively accomplished by the introduction into each of these fixing shells of a duct as shown in Figure 5, connections 44, 45, and 46, by means of which preheated air is inducted upward into the checker brick of the shell where and when desired by the manipulation of valves as set out on the drawings.

The flow of the preheated air through these ducts 46 is controlled by the valves 47 and is shut off from either of the shells, which is being used as a carburetor, by the valve 47 in pipe 44 entering that member, and air is admitted during the blow periods to either of the shells which is being used as a superheater by opening the valve 47 in the pipe 44 entering that member. The preheated air which is admitted through the valve 44 to the valve 47 and the pipe 44 into the superheater may be supplied from an air compressor or other suitable source, not shown in the drawings.

The introduction of the air through this tube as above set out, supplies an excess of oxygen, and results in an oxidizing zone being established in this area and as a result of such oxidizing zone the carbon deposited on the checker brick is burned out, or consumed by oxidation.

It should here be explained that the process of manufacture of carbureted water gas is an intermittent process consisting of a "blow" and a "run." During what is known as the "blow," only air, in addition to the gases coming from the generator, is forced into the top of the carburetor, and down through said carburetor to the bottom thereof and out from the bottom through a duct and into the bottom of the superheater and up through such superheater and out at the top.

The blow has for its object the heating of the apparatus to the proper temperature for gas making.

During what is known as the "run," oil is sprayed into the top of the carburetor into which water-gas is admitted from a generator adapted to generate water-gas in the usual manner. A portion of this oil gasifies and together with the blue water gas coming from the generator, passes down through the carburetor and out through the superheater as heretofore specified.

The air is admitted through the duct above referred to only during a part of the duration of the "blow," and therefore does not come into contact with the carbureted water gas nor affect it in any manner.

It should here be explained that the hot gases are necessarily forced out of the top of the shell used as a superheater and this is taken care of in our apparatus by means of a take-off connection as set out in Figure 1, which shows that when shell B¹ is used as a superheater, the gas goes from this shell to the seal through the connecting pipe containing valve 13, which in this case would be open, and valve 12 in connection from B² to the seal would be closed; and when shell B² is being used as a superheater the gases pass from B² to the seal through the connecting pipe containing valve 12, which in this case would be open, and valve 13, in the connection from B to the seal, would be closed.

When shell B¹ is being used as a superheater, valve 13 is open, and valve 12 is closed; and vice versa, when shell B² is being used as superheater, valve 12 is open and valve 13 is closed.

From the foregoing it will be seen that by means of our method and apparatus, the generator is so connected with each of the fixing shells as to permit of their use alternately as carburetor and a superheater, and by means of the duct shown in Figure 5, air is introduced at desired intervals during the blow into each of said shells when it is being used as the superheater and an oxidizing zone thereby created at the desired point in this shell which results in the burning out, or oxidation of the carbon deposit.

Our invention makes it possible and practicable to direct the flow of the gases after they leave the generator and before they reach the seal, so as to run first in one direction through the top of one of the shells and down through its bottom to the bottom of the other shell and out through the top thereof to the seal, and then reverse such flow and run it through the top of the other shell and down through the bottom thereof to the first shell and out through the top thereof. In other words, to use the shells interchangeably as a carburetor and a superheater and to reverse the flow of the gases accordingly so as to always carry the flow down through the top of the shell that is being used as a carburetor and out through the one that is being used as a superheater. The interval of interchanging these shells with the consequent reversal of flow of the gases will be determined in each individual case depending on the rapidity with which the carbon deposits accumulate and this depends largely on the quality of fuel used, the quality of the enricher, method of operation, and the like.

Having thus described our invention, what we claim is:—

1. The method of manufacturing carbureted water gas by the utilization of a carburetor member and a superheating member and which method comprises directing the flow of gas from the generator into one of said members to use the same as a carburetor and through the other of said members to use the same as a superheater and then reversing the operation whereby the member used as a superheater is now used as a carburetor and separately introducing air during the blow period directly into the member being used as a superheater.

2. The method of manufacturing carbureted water gas by the utilization of a carburetor member and a superheater and which method comprises directing the flow of gas from a generator into one of said members to use the same as a carburetor and through the other of said members to use the same as a superheater and then reversing the operation whereby the member used as a superheater is now used as a carburetor, and separately introducing preheated air during the blow period directly into the member being used as a superheater.

3. The method of manufacturing carbureted water gas by the utilization of a carburetor member and a superheater, and which method comprises directing the flow of gas from the generator into one of said members to use the same as a carburetor and through the other of said members to use the same as a superheater and then reversing the operation whereby the member used as a superheater is now used as a carburetor, and separately introducing air during the blow period into the middle portion of the member which is being used as a superheater.

4. The method of manufacturing carbureted water gas by the utilization of a carburetor member and a superheater and which method comprises directing the flow of gas from a generator into one of said members to use the same as a carburetor and through the other of said members to use the same as a superheater and then reversing the operation whereby the member used as a superheater is now used as a carburetor, and introducing air during the blow period in an upward direction into the middle of the member which is being used as a superheater.

5. The method of manufacturing carbureted water gas by the utilization of interchangeable carburetor and superheater members and which method comprises directing the flow of gas from a generator into one of said members to use the same as a carburetor and through the other of said members to use the same as a superheater and separately creating a localized oxidizing zone in said superheater to remove the carbon therein.

6. The method of manufacturing carbureted water gas by the utilization of interchangeable carburetor and superheater members and which method comprises directing the flow of gas from the generator into one of said members and through the other of said members and separately creating a localized oxidizing zone in the member functioning as a superheater to remove the carbon deposits therein.

7. The method of manufacturing carbureted water gas by the utilization of interchangeable carburetor and superheater members and which method comprises using one member for carbureting until the carbon deposits are formed therein then using it as a superheater member and separately and independently creating an oxidizing zone in the region of the carbon deposits for removing the carbon deposits occasioned by its use as a carburetor member.

8. The method of manufacturing carbureted water gas by the utilization of interchangeable carburetor and superheater members and which method comprises directing the flow of gas in alternate "run" and "blow" periods from a generator into one of said members to use the same as a carburetor and through the other of said members to use the same as a superheater and independently introducing free air into the superheater during the blow period to oxidize any carbon deposits therein.

9. The method of manufacturing carbureted water gas by the utilization of interchangeable carburetor and superheater members, which method comprises directing the flow of gas in alternate "run" and "blow" periods from a generator into one of said members to use the same as a carburetor, and through the other of said members to use the same as a superheater and independently supplying air into the superheater for the oxidation of the carbon therein.

10. The method of manufacturing carbureted water gas by the utilization of interchangeable carburetor and superheater members and which method comprises directing the flow of gas in alternate "run" and "blow" periods from a generator into one of said members to use the same as a carburetor and through the other of said members to use the same as a superheater and independently introducing preheated air into the superheater during the blow period to oxidize any carbon deposits therein.

11. The method of manufacturing carbureted water gas by the utilization of interchangeable carburetor and superheater members and which method comprises directing the flow of gas in the alternate "run" and "blow" periods from a generator into one of said members to use the same as a carburetor and through the other of said members to use the same as a superheater and independently introducing air into the superheater through a conducting means extending into said superheater.

12. The method of manufacturing carbureted water gas by the utilization of a carburetor member and a superheater member and which method comprises directing the flow of gas from the generator into one of said members to use the same as a carburetor and thence through the other of said members to use the same as a superheater and then reversing the operation whereby the member used as a superheater is used as a carburetor and admitting blast gases during the blow periods to the carburetor and simultaneously admitting air to the superheater.

13. The method of manufacturing carbureted water gas by the utilization of a carburetor directing the flow of gas from the generator into one of said members to use the same as a carburetor and thence through the other of said members to use the same as a superheater and then reversing the operation whereby the member used as a superheater is used as a carburetor and admitting gases during the blow periods to the member being used as a carburetor, and air to the other member being used as a superheater.

GEORGE WALLACE SMITH.
FRANK L. WEISSER.